United States Patent [19]

Yamada et al.

[11] Patent Number: 5,193,023
[45] Date of Patent: Mar. 9, 1993

[54] METHOD OF CONTROLLING THE DOMAIN OF A NONLINEAR FERROELECTRIC OPTICS SUBSTRATE

[75] Inventors: Masahiro Yamada, Miyagi; Koichiro Kishima, Kanagawa, both of Japan

[73] Assignee: Sony Corporation, Tokyo, Japan

[21] Appl. No.: 729,897

[22] Filed: Jul. 15, 1991

Related U.S. Application Data

[63] Continuation-in-part of Ser. No. 553,395, Jul. 17, 1990, abandoned.

[30] Foreign Application Priority Data

| Jul. 17, 1989 | [JP] | Japan | 1-184362 |
| Jul. 17, 1989 | [JP] | Japan | 1-184364 |
| Dec. 28, 1989 | [JP] | Japan | 1-344270 |
| May 15, 1990 | [JP] | Japan | 2-124786 |

[51] Int. Cl.$^5$ .......................... G02F 1/03; G11C 11/22
[52] U.S. Cl. .................................. 359/245; 359/251; 365/117; 365/145
[58] Field of Search .......... 350/355, 354, 362; 310/320, 359; 365/145, 157, 117; 361/233; 65/30.13; 359/251, 254, 245

[56] References Cited

U.S. PATENT DOCUMENTS

| 3,229,261 | 1/1966 | Fatuzzo et al. | 365/117 |
| 3,701,122 | 10/1972 | Geusic et al. | 365/145 |
| 3,701,585 | 10/1972 | Barkley et al. | 359/251 |
| 3,732,549 | 5/1973 | Barkely | 359/251 |
| 3,799,648 | 3/1974 | Flippen | 359/251 |
| 4,155,055 | 5/1979 | Phillips | 361/233 |
| 4,636,799 | 1/1987 | Kubick | 359/251 |
| 4,995,705 | 2/1991 | Yoshinaga et al. | 365/145 |

FOREIGN PATENT DOCUMENTS

| 1234319 | 2/1967 | Fed. Rep. of Germany . | |
| 2812955 | 10/1978 | Fed. Rep. of Germany | 359/251 |
| 7708628 | 10/1978 | France . | |
| 0246545 | 6/1990 | Japan . | |

OTHER PUBLICATIONS

"Thermal Capacitive-Ferroelectric Storage Device"; IBM Tech. Disclosure Bulletin, vol. 15, No. 4 (Sep. 1972) p. 1294.
PCT WO/09094 Application Aug. 20, 1990 "Controlling regions of ferroelectric domains".

*Primary Examiner*—Bruce Y. Arnold
*Assistant Examiner*—Evelyn A. Lester
*Attorney, Agent, or Firm*—Hill, Steadman & Simpson

[57] ABSTRACT

A method of controlling the domain of a nonlinear ferroelectric optics substrate to form an inverted-domain structure in one major surface of a single-domain nonlinear ferroelectric optics substrate. A first electrode is formed in a first major surface of a nonlinear ferroelectric optics substrate in a pattern corresponding to a desired pattern of an inverted-domain structure to be formed, a second electrode is formed on a second major surface opposite the first major surface in a pattern corresponding to that of the first electrode or in a solid film, a dc voltage or a pulse voltage is applied across the first and second electrodes to form local, inverted domains in the desired pattern in the first major surface of the nonlinear ferroelectric optics substrate. An insulating film may be formed between the first electrode and the first major surface to avoid damaging crystals of the nonlinear ferroelectric optics substrate by the current that flow across the nonlinear ferroelectric optics substrate when the dc voltage or the pulse voltage is applied across the first and second electrodes.

22 Claims, 5 Drawing Sheets

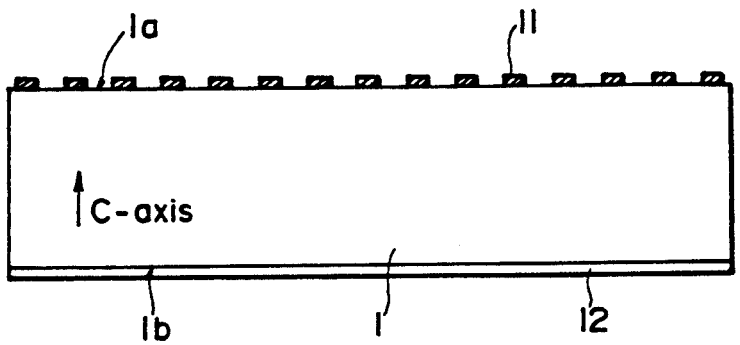
FIG. 3A
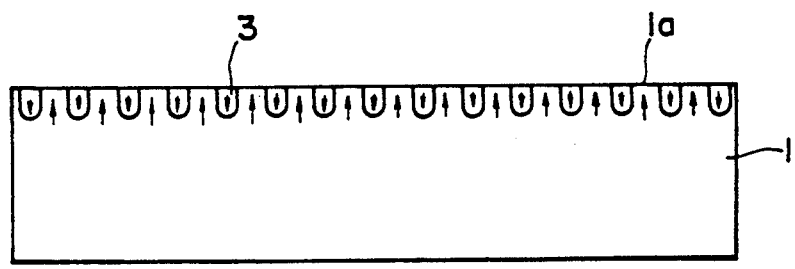
FIG. 3B
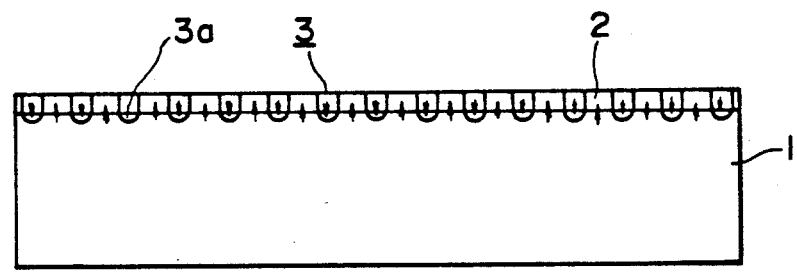
FIG. 3C₁
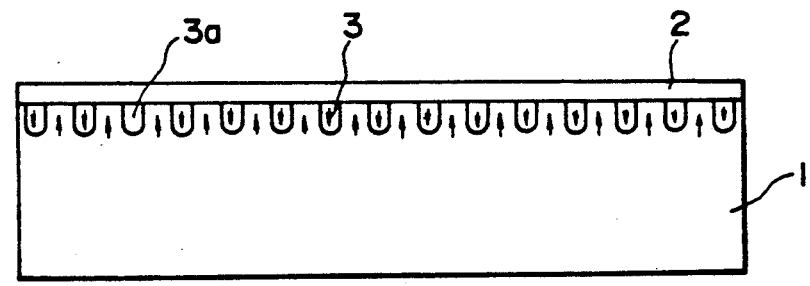
FIG. 3C₂

METHOD OF CONTROLLING THE DOMAIN OF A NONLINEAR FERROELECTRIC OPTICS SUBSTRATE

This is a continuation-in-part of application Ser. No. 553,395, filed Jul. 17, 1990 now abandoned.

BACKGROUND OF THE INVENTION

Nonlinear optical techniques, such as SHG, are applied to the conversion of the wavelength of laser light. The use of the SHG, which is capable of reducing the wavelength of laser light, increases recording density in optical recording and reproduction using a laser beam and magnetooptic recording and reproduction.

Phase matching conditions must be satisfied between the fundamental wave and the second higher harmonic for efficient nonlinear optical interaction. However, since the refractive index of optical materials, in general, is dependent on wavelength (dispersion occurs in optical materials), optical materials are unable to satisfy conditions for phase matching between the fundamental wave and the second higher harmonic.

In a periodic inverted-domain structure of a nonlinear ferroelectric optical bulk having domains of nonlinear optical coefficient of periodic inverted signs, it is known that waves produced by the nonlinear polarization of the layers are of the same phase and intensify each other when the thickness of the layers is equal to the product of the coherence length (a length where the phase mismatching angle is $\pi$). Such knowledge is disclosed in, for example, J. A. Armstrong, N. Bloembergen, J. Ducuing and P. S. Pershan, Physical Review. 127, (1962), pp. 1918 ~, and D. Feng, N. B Ming, J. F. Hong et al., Applied Physics Letters, 37, (1980), pp. 607–609. Accordingly, materials incapable of direct phase matching, and the maximum nonlinear sensitivity tensor component $d_{33}$, which could not have been utilized, can be utilized.

On the other hand, the employment of an optical waveguide structure enables the confinement of light in a waveguide at a high energy density and enables the propagation of light for a long distance in a high energy-density state. However, since the dispersion in the material is significant, it is difficult to match the phases of the fundamental wave and the second higher harmonic.

A SHG using the Cerenkov radiation of a nonlinear waveguide is disclosed in Applied Physics, 56 (1987), pp. 1637–1641, and P. K. Tien, R. Ulrich and R. J. Martin, Applied Physics Letters, 17, (1970), pp. 447 ~450. This SHG intensifies waves produced by nonlinear polarization with a Cerenkov angle of $\alpha$ so as to satisfy phase matching automatically and radiates the intensified waves. According)y, a SHG employing a substrate formed of a material having a high nonlinear optical constant is expected to operate at a high efficiency. The nonlinear waveguide SHG of Cerenkov radiation type disclosed in the former reference (Applied Physics) uses the maximum nonlinear sensitivity tensor component $d_{33}$ of $LiNbO_3$. The spot pattern, i.e., the far field pattern, of a light beam emitted by the substrate of the SHG of Cerenkov radiation type is a peculiar pattern, such as a crescent spot pattern and hence it is difficult to focus the light beam to the limit of diffraction by an optical lens system. Since the overlap of the fundamental wave and the Cerenkov wave in the waveguide of the waveguide SHG of Cerenkov radiation type affects significantly the efficiency of the SHG, it is desirable that the Cerenkov angle $\alpha$ is small so that the degree of overlap is large.

The function of the optical waveguide SHG of Cerenkov radiation type will be examined hereinafter. In a waveguide 2 formed on a nonlinear optical substrate 1, a higher harmonic is produced at an angle $\alpha$ as shown in FIG. 4 when the propagation constant of the guided mode (fundamental wave) in the waveguide 2 is $\beta_F$, and the propagation constant of a bulk wave (higher harmonic) in the substrate 1 is $k_{SHS}$. Then, $$\Delta k = 2\beta_F - k_{SHS} = 2k_{FO}\{(\beta_F/k_{FO}) - n_{SHS}\} \quad (1)$$

$$2\beta_F = k_{SHS} \cos \alpha \quad (2)$$

where $\Delta k$ is phase mismatching component, $k_{FO}$ is propagation constant $(2\pi/\lambda_F)$ of the higher harmonic in a vacuum and $n_{SHS}$ is the refraction index of the substrate with the higher harmonic. Then, $$\cos \alpha = (\beta_F/k_{FO}) \cdot n_{SHS} \quad (3)$$

$$n_{SHS} = n_{SHo} \cdot n_{SHe} / \sqrt{(n_{SHo})^2 \cdot \cos^2 \alpha + (n_{SHe})^2 \cdot \sin^2 \alpha} \quad (4)$$

where $n_{SHo}$ and $n_{SHe}$ are the respective refraction indices of an ordinary ray and an extraordinary ray of higher harmonic wavelength.

Condition for propagating the fundamental wave through the waveguide 2 is $$n_{FS} \leq \beta_F/k_{FO} \leq n_{SHS} \quad (5)$$

where $n_{FS}$ and $n_{FF}$ are the respective refractive indices with the fundamental wave of the substrate 1 and the waveguide 2. Condition for Cerenkov radiation is $$\beta_F/k_{FO} \leq n_{SHS} \quad (6)$$

When conditions represented by Expressions (5) and (6) are met Cerenkov radiation second harmonic generation occurs. These conditions are shown graphically in FIG. 5, in which the wavelength of the incident light on the $LiNbO_3$ waveguide is 1.064 μm (YAG laser light) in the TM mode, the refractive index of the substrate is 2.155 and the refractive index of the waveguide is 2,288. In FIG. 5, refractive index (equivalent refractive index) is measured on the horizontal axis, and the thickness of the waveguide is measured on the vertical axis. When the thickness of the waveguide is not more than about 1.0 μm, a single-mode action is possible. Incidentally, the Cerenkov angle $\alpha$ on a SHG employing an optical waveguide formed by subjecting the surface of a $LiNbO_3$ substrate to proton substitution is about 13° when the wavelength of the fundamental wave is 1.064 μm, and is about 16° when the same is 0.83 μm.

If the Cerenkov radiation angle $\alpha$ in the nonlinear waveguide SHG of Cerenkov radiation type can be reduced, the respective directions of propagation of the fundamental wave and the higher harmonic can be made to coincide with each other, the degree of overlap of the fundamental wave and the higher harmonic can be increased, the conversion efficiency can be improved, and the spot pattern of the output light beam can be improved.

To solve the foregoing problems, the applicant of the present patent application proposed previously an improved SHG as shown in FIG. 2 in Japanese Patent Application No. 63-246545. This SHG comprises a nonlinear ferroelectric optics substrate 1 and an optical waveguide 2 formed on the nonlinear ferroelectric optics substrate 1 and produces a second higher harmonic by Cerenkov radiation. This SHG reduces the Cerenkov angle $\alpha$ to improve the spot pattern of the second higher harmonic light beam and to improve the conversion efficiency by forming a periodic inverted-domain structure 3 on the substrate 1 and forming an optical waveguide 2 on the periodic inverted-domain structure 3 or by forming a periodic inverted-domain structure 3 in the waveguide 2.

However, such a SHG has many problems in the practical fabrication of the inverted-domain structure 3. A method of alternately inverting domains by controlling current in forming a nonlinear ferroelectric optics crystal by a Czochralski method is disclosed in D. Feng, N. B. Ming, J. F. Hong et al., Applied Physics Letters, 37, 607 (1980); K. Kassau, H. I. Levinstein and G. H. Loiacono, Applied Physics Letters, 6, 228 (1965); and A. Feisst and P. Koidl, Applied Physics Letters, 47, 1125 (1985). This process, however, requires a large-scale equipment and difficult control for micron order domain formation.

Another method of domain inversion diffuse Ti in a nonlinear ferroelectric optics crystal, which, however, entails change in the refractive index of portions in which the domain is inverted, dividing the SH beam into a plurality of beams.

As mentioned above, the conventional method of forming inverted-domain structure is unable to control domains accurately, causes change in the refractive index entailing the division of the second harmonic beam into a plurality of beams, and hence is unable to provide a SHG capable of operating at a high conversion efficiency.

SUMMARY OF THE INVENTION

In a first aspect of the present invention, as shown in FIG. 1, a first electrode 11 and a second electrode 12 are formed opposite to each other respectively on the opposite major surfaces of a single-domain nonlinear ferroelectric optics substrate 1, at least either the first electrode 11 or the second electrode 12 is formed in a desired electrode pattern corresponding to the pattern of an inverted-domain structure to be formed, and the domain is controlled by applying a given dc voltage or a given pulse voltage across the opposite electrodes 11 and 12 to form locally-inverted-domain structure 3 in a pattern corresponding to the electrode pattern by applying a predetermined dc voltage or a pulse voltage across the opposite electrodes 11 and 12.

According to this method in accordance with the present invention, the spontaneous polarization of portions to which an electric field is applied by applying a dc voltage or a pulse voltage across the first electrode 11 and the second electrode 12, namely, portions corresponding to the electrode pattern, is inverted to form the inverted domain regions. Such inversion is considered to be due to the minute change in ions in the unit lattice of the nonlinear ferroelectric optics substrate 1 by the application of an electric field.

Since the inverted-domain structure is formed in a desired pattern simply by using an electrode pattern, a precision inverted=structure can be formed at minute pitches and in minute pattern by forming an electrode pattern by a highly precision minute process, such as a photolithographic process, and the thickness of the inverted-domain structure can readily be controlled with high accuracy by controlling the voltage to be applied across the electrodes.

In a second aspect of the present invention, as shown in FIG. 6, a first electrode 11 and a second electrode 12 are formed opposite to each other respectively on the opposite major surfaces $1a$ and $1b$ of a nonlinear ferroelectric optics substrate 1, either the first electrode 11 or the second electrode 12, concretely, the first electrode 11, is formed on an insulating film 4 formed on the major surface $1a$ on which an inverted-domain structure is to be formed in a pattern corresponding to that of the inverted-domain structure, and a given dc voltage or a given pulse voltage is applied across the first electrode 11 and the second electrode 12 by a power source 13 to form a locally-inverted=domain structure 3 in the pattern of the first electrode 11 in the major surface $1a$ of the nonlinear ferroelectric optics substrate 1 as shown in FIG. 3B. The insulating film 4 is formed of a heat-resistant material that withstands heating and remains stable to the actions of materials forming the electrodes 11 and 12 and the nonlinear ferroelectric optics substrate 1.

Thus, the domain of the nonlinear ferroelectric optics substrate 1 is inverted locally simply by applying a dc voltage or a pulse voltage across the electrodes 11 and 12 formed respectively on the major surfaces $1a$ and $1b$ of the nonlinear ferroelectric optics substrate 1 by a simple apparatus and through a simple process. The insulating film 4 interposed between the first electrode 11 and the major surface $1a$ of the nonlinear ferroelectric optics substrate 1 prevents damaging the crystals of the nonlinear ferroelectric optics substrate 1 by current that flows when a dc voltage of a pulse voltage is applied across the electrodes 11 and 12, the diffusion of atoms between the materials forming the adjacent components and the deterioration in purity of the nonlinear ferroelectric optics substrate 1. Accordingly, a Cerenkov radiation SHG (second harmonic generator) of a waveguide type incorporating an optical waveguide employing the inverted-domain structure formed in the major surface 1a has excellent characteristics, is capable of operating at a high efficiency and is capable of forming a beam spot of a satisfactory shape.

When a pulse voltage is used for forming the inverted domains, damages in the crystals of the nonlinear ferroelectric optics substrate 1 liable to be caused by an excessive continuous current that flows when a dc voltage is used can be prevented even if a comparatively high pulse voltage is applied, and the adverse effect of heat on the nonlinear ferroelectric optics substrate 1 and the difusion of the electrodes materials can be avoided because a comparatively high pulse voltage can be applied and hence the nonlinear ferroelectric optics substrate 1 need not be heated at a very high temperature. Thus, the inverted domains can be formed at minute intervals.

In a third aspect of the present invention, as shown in FIG. 8, parallel masking stripes 31 capable of absorbing or reflecting a heating electromagnetic wave for heating a nonlinear ferroelectric optics substrate 1, such as heat rays radiated by a heater, laser rays emitted by a laser or an electromagnetic wave, are formed on a major surface $1a$ of the nonlinear ferroelectric optics substrate 1 in a desired pattern, namely, a pattern corresponding to the pattern of an inverted-domain structure to be formed in the major surface 1a of the nonlinear ferroelectric optics substrate 1, and the electromagnetic wave is radiated from above the masking strips 31 to form a locally-inverted-domain structure 31 of a pattern corresponding to that of the masking stripes 31 as shown in FIG. 3B by heating the nonlinear ferroelectric optics substrate 1 in a pattern corresponding to that of the masking stripes 31.

Forming the masking stripes 31 capable of absorbing or reflecting a heating electromagnetic wave on the major surface 1a of the nonlinear ferroelectric optics substrate 1 enables the local heating of the nonlinear ferroelectric optics substrate 1 to form portions susceptible to polarization by rapid local heating at a heating and cooling rate of more than 5° C./min and causes the polarization of those portions effectively for domain inversion by a voltage of charges induced by pyroelectric effect.

BRIEF DESCRIPTION OF THE DRAWINGS

The above and other objects, features and advantages of the present invention will become more apparent from the following description taken in connection with the accompanying drawings, in which:

FIGS. 3A, 3B, $3C_1$ and $3C_2$ are side elevations of optical waveguide SHG in different stages of a manufacturing process for carrying out a method of controlling the domains of a nonlinear ferroelectric optics substrate, embodying the present invention;

DETAILED DESCRIPTION OF THE PREFERRED EMBODIMENTS

First Embodiment

Figure 1:
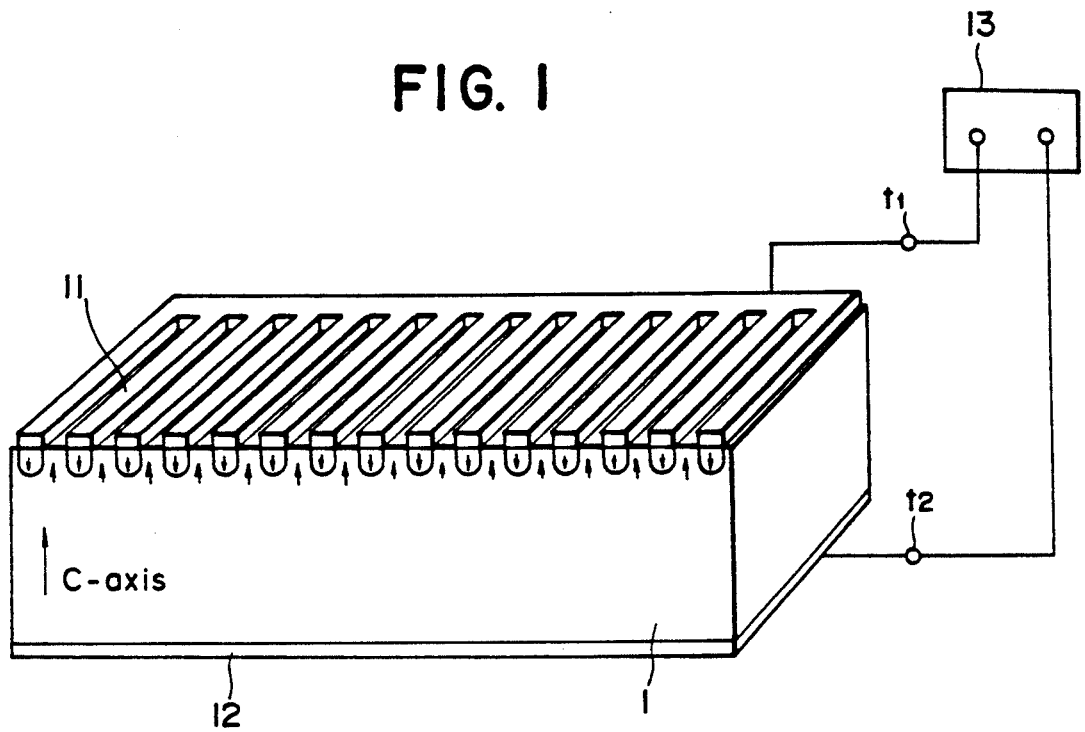
FIG. 1 is a perspective view of assistance in explaining a method of controlling the domain of a nonlinear ferroelectric substrate, embodying the present invention.

The application of a method of controlling the domain of a nonlinear ferroelectric optics substrate in a first embodiment according to the present invention to forming a waveguide SHG having an inverted-domain structure 3 will be described hereinafter with reference to FIGS. 3A, 3B, $3C_1$ and $3C_2$.

As shown in FIG. 3A, a single-domain nonlinear ferroelectric optics substrate 1 is a so-called z-substrate of lithium niobate ($LiNbO_3$) of high nonlinearity prepared by applying a dc voltage across the major surfaces 1a and 1b at a temperature at the Curie temperature, for example, a temperature on the order of 1200° C., to align all the c-axis with the direction of the thickness. A first electrode 11 and a second electrode 12 are formed of a metal, for example, Pt, respectively on the major surfaces 1a and 1b. The major surface 1a is a +c-surface. The first electrode 11 is a parallel arrangement of electrode stripes arranged at a pitch corresponding to the pitch 2 Λ of inverted domains to be formed, and having interconnected ends interconnected by a connecting electrode which, in turn, is connected to a terminal $t_1$. Thus, the pattern of the first electrode 11 has the shape of a comb. The first electrode 11 is formed by a known process, such as a photolithographic process. In forming the first electrode 11 by a photolithographic process, a metal film, such as a Pt film, is formed over the entire area of the major surface 1a of the substrate 1 by metal vapor deposition, a photoresist of a pattern corresponding to that of the inverted domains to be formed, namely, a pattern resembling a comb, is formed over the surface of the metal film by a photographic process, and then the metal film is etched in the pattern by using the photoresist. It is also possible to form the first electrode 11 by forming a lift-off mask on the major surface 1a of the substrate 1 in a pattern complementary to that of the first electrode 11, forming a metal film over the entire area of the major surface 1a of the substrate 1, and removing the lift-off mask. The first electrode 11 and the second electrode 12 may be formed of any suitable metal having a high melting point, such as Pt, W, Ta, Ti, ITO or SnO.

The other major surface 1b of the substrate 1 is a -c-surface. The second electrode 12 may be a metal film formed over the entire area of the major surface 1b. The second electrode 12 is connected to a terminal $t_2$.

When necessary, the substrate 1 is heated in a given atmosphere, such as an oxygen atmosphere, a nitrogen atmosphere, a rare gas atmosphere or a water vapor atmosphere containing oxygen, at a temperature in the range of 150° to 1200° C. to reduce the intensity of the coercive electric field, and a dc voltage is applied across the terminals $t_1$ and $t_2$ for a given time interval by a dc power source 13 so that an electric field of an intensity in the range of several tens volts per centimeter to several thousands volts per centimeter is created across the substrate 1 to form an inverted-domain structure 3. The inverted-domain structure 3 comprises inverted domains of a direction reverse to the direction of the +c-axis formed in a pattern corresponding to that of the first electrode 11, in which the pitch of the parallel inverted domains is 2 Λ (2 Λ is in the range of 0.1 to 500 μm). For example, when a dc voltage of 10 V was applied for twenty minutes to a 1 mm thick $LiNbO_3$ substrate heated at 650° C. in air, an inverted-domain structure 3 comprising parallel stripes of inverted domains arranged at a pitch of 2 Λ was formed in the major surface 1a.

Referring to FIG. 3B, the first electrode 11 and the second electrode 12 are removed. When the first electrode 11 and the second electrode 12 are formed of Pt, the same are removed by wet etching using aqua regia ($HNO_3$: HCl=1:3).

Referring to FIG. $3C_1$, an optical waveguide 2 having a refraction index greater than that of the substrate 1 is formed in the major surface 1a by applying, for example, pyrophosphoric acid to the major surface 1a of the substrate 1 having the periodic inverted-domain structure 3 and subjecting the same to thermal diffusion, or by immersing the major surface 1a in a hot phosphoric acid for proton exchanging.

The optical waveguide 2 thus formed includes the periodic inverted-domain structure 3. An optical waveguide 2 may be formed over the major surface 1a having the periodic inverted-domain structure 3 of the substrate 1 by another method as shown in FIG. 3C$_2$ by forming a layer of a linear or nonlinear material having a small fundamental wave absorption coefficient, such as Ta$_2$O$_5$ doped with TiO$_2$ so that $0 < \text{Ti}/(\text{Ti}+\text{Ta}) \leq 60$ (atomic percent), silicon nitride, titanium dioxide, arsenic selenide glass, zinc sulfate or zinc oxide by a vapor deposition process or an epitaxial growth process.

Figure 2:
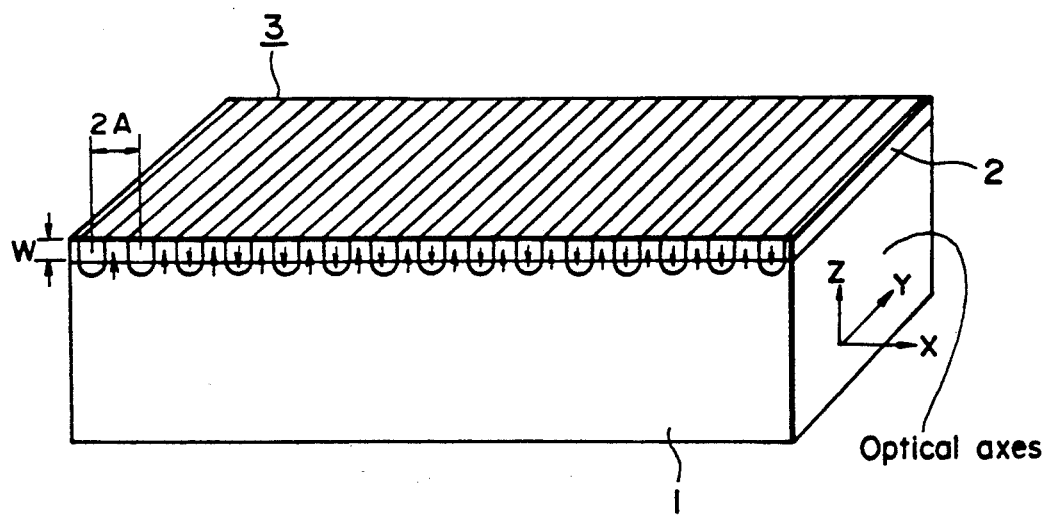
FIG. 2 is a perspective view of a SHG formed by a method of controlling the domain of a nonlinear ferroelectric substrate, embodying the present invention.
Figure 4:
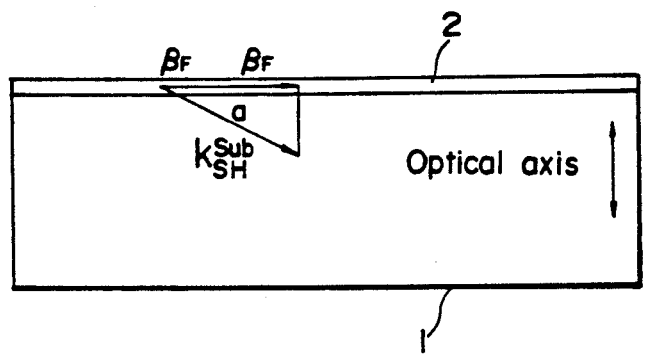
FIG. 4 is an illustration of assistance in explaining the phase matching function of a conventional Cerenkov SHG.

An inverted domain other than the inverted-domain structure 3 having a pattern of parallel stripes, namely, an inverted domain corresponding to the connecting electrode, is cut off to finish a SHG having the periodic inverted-domain structure 3 having parallel stripes of inverted domains extending across the direction of light transmission as shown in FIG. 2.

It is desirable that the optical waveguide 2 is of a ridge structure having a limited width.

In this embodiment, the first electrode 11 is formed on the major surface 1a, i.e., +c-surface, of the substrate 1 in a pattern of parallel stripes, and the periodic inverted-domain structure 3 having a pattern corresponding to that of the first electrode 11 is formed in the +c-surface. It is also possible to form an optical waveguide 2 on the other major surface 1b of the substrate 1 by forming the second electrode 12 in a pattern of stripes on the major surface 1b and forming a periodic inverted-domain structure in the major surface, i.e., the −c-surface, of the substrate 1.

Conditions for the operation of the SHG having the construction shown in FIG. 2 will be discussed hereinafter.

The mismatching component $\Delta k$ between the propagation constant $\beta_F$ (or the equivalent refractive index $\beta_F/(2\pi/\lambda_F) = \beta_F/k_{FO}$, where $\lambda_F$ is the wavelength of the fundamental wave and $k_{FO}$ is the wave number of the fundamental wave in vacuum) and the wave number $k_{SH} = 2\pi \cdot n_{SHS}/\lambda_{SH}$, where $n_{SHS}$ is the refractive index of the substrate 1 with the higher harmonic, of a Cerenkov radiation, i.e., a higher harmonic is expressed by:

$$\Delta k = 2\beta_F - k_{SH} = 4\pi\{(\beta_F/k_{FO}) - n_{SHS})\}/\lambda_F = 4\pi \cdot \Delta n/\lambda_F \qquad (7)$$

Figure 5:
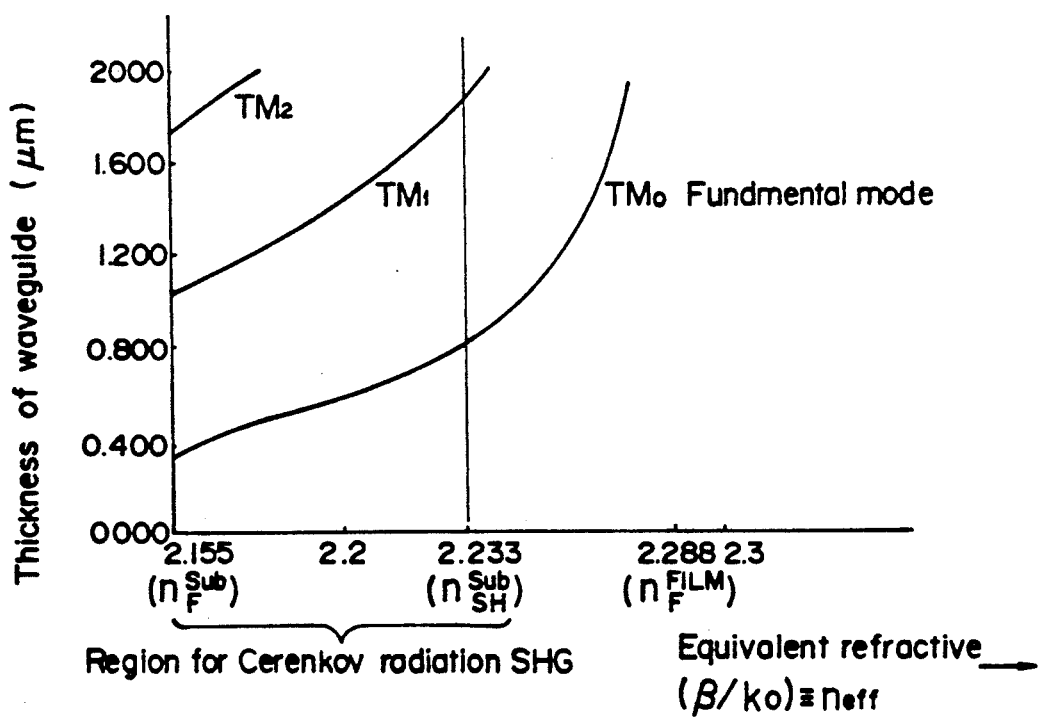
FIG. 5 is a graph showing the relation between the equivalent refractive index and film thickness for guided modes.

As shown in FIG. 5, the Cerenkov radiation is emitted when $\Delta n$ is negative. When the SHG is provided with the periodic inverted-domain structure 3 of the foregoing construction, $\Delta n \ (=(\beta_F/k_{FO}) - n_{SHS})$, the pitch $2\Lambda$ of the inverted domains, the film thickness, i.e., a parameter dominating the propagation constant for the guided mode, and the refractive index $n_{SHS}$ of the waveguide must meet the following conditions.

As regards a Cerenkov SHG of a waveguide construction provided with the conventional periodic inverted-domain structure (bulk), a condition that the thickness of each inverted domain is odd times the coherence length $l_c$, namely, a condition that the generated polarized waves are the same in phase and intensify each other, is the same for the fundamental wave in the guided mode and the higher harmonic of the bulk wave. From Expressions (1) and (7), $$l_c = \pi/|\Delta k| = \lambda_F/(4|\Delta n|) \qquad (8)$$

Therefore, $$\Lambda = l_c(2q+1) \ (q = 0, \pm 1, \pm 2, \ldots) \qquad (9)$$

When q=0, $$\Lambda = l_c = \lambda_F/(4|\Delta n|) \qquad (10)$$

and hence the angle between the fundamental wave and the higher harmonic is zero.

Expression (10) can be rewritten as follows.

$$\lambda_F/2\Lambda = 2|\Delta n| \qquad (11)$$

or $$\lambda_{SH}/2 \ \Lambda = |\Delta n| \qquad (12)$$

On the other hand, the propagation constant is subject to the purturbation (Bragg reflection) of $P\pi/\Lambda$ (P is the degree of Bragg reflection) of the periodic structure. (Refer to A Yariv, "Optical Electronics" pp. 414–421 Holt, Rinehart and Wilson, 1985.) The components of Expressions (11) and (12) purturb $\beta_F$ and $k_{SH}$ for phase matching. When P=1. From Expressions (1), (11) and (12), $$2\{\beta_F - (2\pi/2\Lambda)\} - \{k_{SHS} - (2\pi/2 \ \Lambda)\}$$

$$= 2k_{FO}[\}(\beta_F/k_{FO}) - n_{SHS}\} - (\lambda_F/4\Lambda)] = 0 \qquad (13)$$

Thus, the condition for the operation of the periodic inverted-domain structure is equivalent to the condition for phase matching by the purturbation of the propagation constant $\pi/\Lambda$ based on the periodic structure. To satisfy the condition of Expression (13), $$(\beta_F/k_{FO}) > n_{SHS} \qquad (14)$$

which is reverse to the condition for Cerenkov radiation expressed by Expression (6).

In the foregoing example, the first electrode 11 and the second electrode 12 are formed directly on the major surfaces 1a and 1b of the nonlinear ferroelectric optics substrate 1. The second electrode 12 may be substituted by a separate electrode plate which is to be applied closely to the major surface 1b of the substrate 1.

Although the inverted-domain structure is formed on the substrate 1 having the shape of a plate in this embodiment, an inverted-domain structure may be formed in a thin film of a nonlinear ferroelectric optics material formed on a base plate formed of glass, sapphire or lithium niobate by forming a widthwise single domain in the thin film, forming the first electrode 11 on the thin film, forming the second electrode 12 on the backside of the base plate and applying an electric field to the thin film. When the base plate is a conductive plate, the base plate may be used as the second electrode 12.

According to this method of the present invention, the spontaneous polarizations of portions of the nonlinear ferroelectric optics substrate 1 exposed to an electric field, namely, portions corresponding to the pattern of the first electrode 11, are inverted to form inverted domains. Thus, the inverted-domain structure having a desired pattern can be formed simply by using the electrode having a pattern corresponding to the desired pattern of the inverted-domain structure. Since the pattern of the electrode having minute stripes arranged at a very small pitch can accurately and minutely be formed by a precision minute process, such as a photolithographic process, the inverted-domain structure can be formed in a minute pattern. The inverted-domain structure can readily be formed in an accurate thickness by controlling the voltage to be applied across the electrodes.

Since the inverted domains are not formed by doping, such as Ti doping, the refractive index of the inverted domains remains unchanged and hence the division of a SH beam into a plurality of beams due to the change of the refractive index can be avoided in the waveguide SHG provided with the periodic inverted-domain structure 3 shown in FIG. 2. Since phase mismatching can be avoided, the significant reduction in the freedom of the waveguide and domain modulation can be avoided. The crescent far field pattern of the output light beam attributable to the deep penetration of the second harmonic into the substrate 1 can be avoided and the output light beam can easily be condensed near to the limit of diffraction. The overlap of the fundamental wave and the second harmonic improves the conversion efficiency.

Example

A first electrode 11 having a desired pattern and a second electrode 12 were formed on a single-domain nonlinear ferroelectric substrate 1 formed by the same method as that applied to the first embodiment.

The substrate 1 was heated in a given atmosphere suitable for the material forming the substrate 1, such as an atmosphere of oxygen, air, nitrogen, a rare gas, or steam containing oxygen, at a temperature in the range of 150° to 1200° C., preferably 300° to 1200° C., to reduce the intensity of the coercive electric field while a pulse voltage of a pulse width in the range of several microseconds to several minutes was applied once or several thousands times across the terminals $t_1$ and $t_2$ by a pulse power source 13 so that an electric fields of several hundreds volts per centimeter to several thousands kilovolts per centimeter was created in the direction of the thickness of the substrate 1, i.e., the direction of the c-axis. Thus, a periodic inverted-domain structure 3 of parallel stripe-shaped inverted domains having a pattern corresponding to the first electrode 11 was formed. The pitch $2\Lambda$ of the stripes of the pattern of the first electrode 11 was in the range of 1 to 500 μm. For example, a periodic inverted-domain structure 3 comprising inverted domains having a polarity reverse to the direction of the +c-axis and arranged at a pitch $2\Lambda$, which corresponds the stripes of the first electrode 11, was formed in the major surface 1a i.e., the $f_c$ surface, of a 1 mm thick $LiNbO_3$ substrate, by applying a pulse voltage of 4 kV having a pulse width of 0.1 sec twice across the terminals connected to the first electrode 11 and the second electrode 12 while the substrate 1 was heated at 650° C. in air.

The substrate 1 provided with the periodic inverted-domain structure 3 can be used for forming an optical waveguide or a SHG.

The use of the pulse voltage for forming the inverted domains prevents, even if the pulse voltage is considerably high, damages in the crystals of the nonlinear ferroelectric optics substrate 1 liable to be caused by an continuous current that flows when a dc voltage is used, and prevents the adverse effect of heat on the nonlinear ferroelectric optics substrate 1 and the diffusion of the electrodes, because a comparatively high pulse voltage can be applied and hence the nonlinear ferroelectric optics substrate 1 need not be heated at a very high temperature to reduce the coercive electric field and the inverted domains can be formed in a minute pattern.

Second Embodiment

Figure 6:
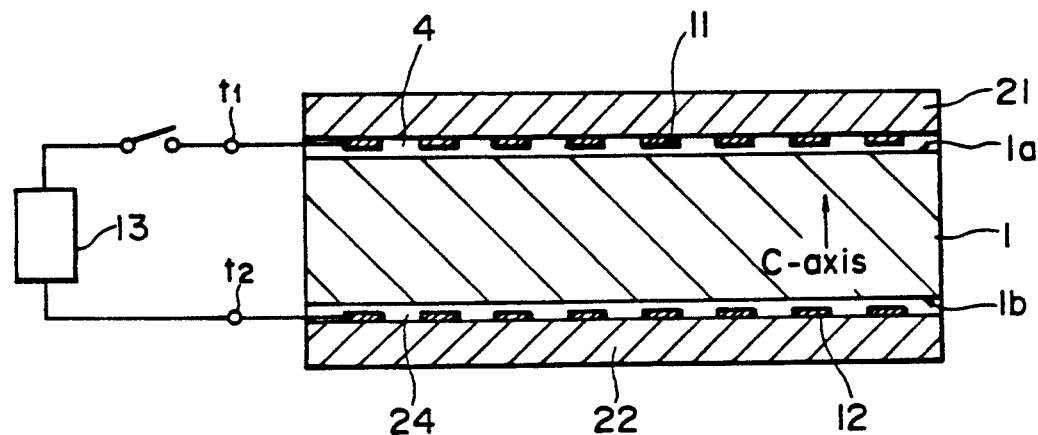
FIG. 6 is a sectional view of assistance in explaining domain inversion by a method of controlling the domain of a nonlinear ferroelectric optics substrate, embodying the present invention.
Figure 7:
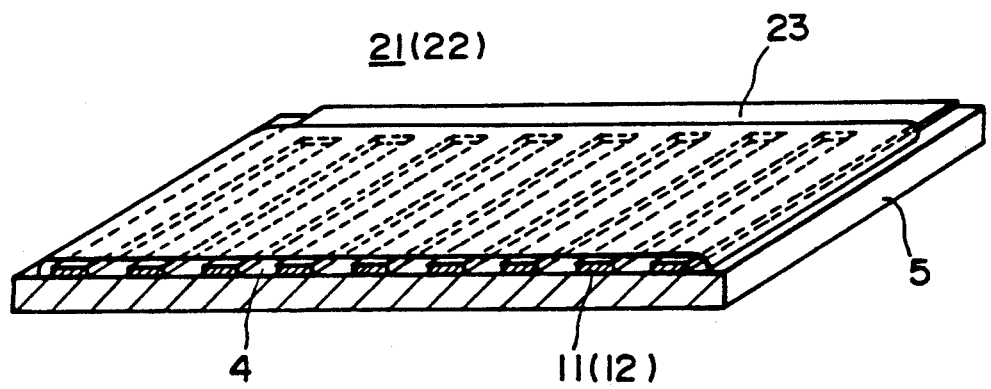
FIG. 7 is a perspective view of a domain control electrode.
Figure 8:
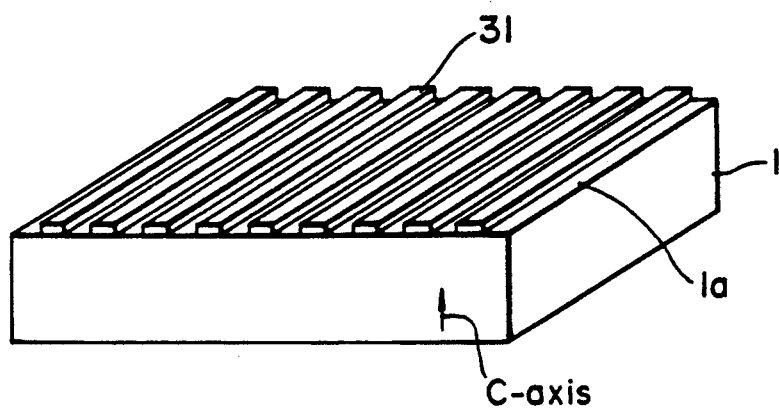
FIGS. 8 and 9 are perspective views of assistance in explaining methods of controlling the domain of a nonlinear ferroelectric optics substrate, embodying the present invention.
Figure 9:
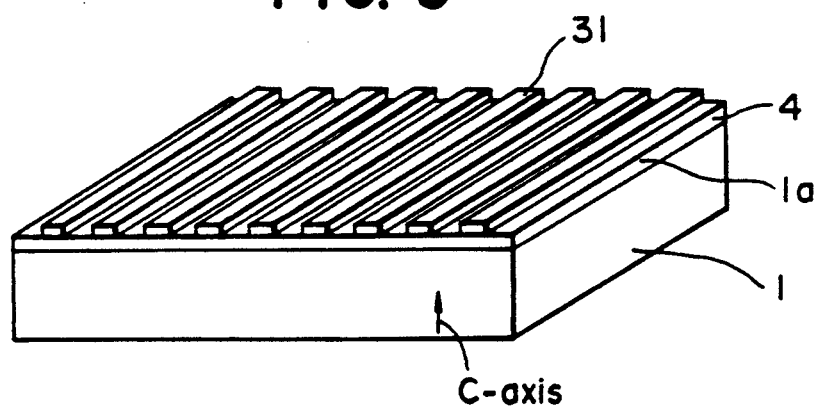

As shown in FIG. 6, a first electrode 11 and a second electrode 12 are formed respectively on the opposite major surfaces 1a and 1b of a single-domain nonlinear ferroelectric optics substrate 1 prepared by the same method as applied to the first embodiment. Each of the first electrode 11 and the second electrode 12 is formed of a metal having a high melting point, such as platinum (Pt), tungsten (W), titanium (Ti) or ITO, in a pattern corresponding to the pattern of an objective periodic inverted-domain structure on a separate insulating substrate 5 formed of a material capable of stably maintaining its original characteristics under heat, such as $SiO_2$, $Al_2O_3$ or sapphire as shown in FIG. 7. The electrodes 11 and 12 can be formed in such a pattern by a vapor deposition process and a subsequent photolithographic etching process. At least either the first electrode 11 or the second electrode 12, particularly the first electrode 11 corresponding to the major surface 1a in which a periodic inverted-domain structure 3 is to be formed, is a parallel arrangement of electrode strips each of a width corresponding to the width of the inverted domain, arranged at a pitch corresponding to that of the inverted domains of the periodic inverted-domain structure 3, and having interconnected ends interconnected by a connecting electrode 23 in an ineffective portion outside a portion of the insulating 5 corresponding to the periodic inverted-domain structure 3. Thus, the pattern of the first electrode 11 has the shape of a comb.

The electrodes 11 and 12 are coated each with an insulating film 4 formed of a material capable of remaining stable under the heating temperature, which will be described afterward, such as $Al_2O_3$, $Si_xN_y$ or $SiO_2$. The first electrode 11 and the second electrode 12 are thus formed respectively on the insulating substrates 5 construct a first electrode structure 21 and a second electrode structure 22. As shown in FIG. 6, the electrode structures 21 and 22 are disposed opposite to each other on the major surfaces 1a and 1b of the nonlinear ferroelectric optics substrate 1 with the insulating films 4 in contact with the major surfaces 1a and 1b, respectively. When both the electrodes 11 and 12 are formed in a pattern corresponding to that of the periodic inverted=domain structure to be formed, the electrode structures 21 and 22 are disposed so that the respective electrode strips of the electrode structures 21 and 22 are directly opposite to each other.

When the first electrode structure 21 and the second electrode structure 22 respectively comprising the first electrode 11 and the second electrode 12 are thus formed separately from the nonlinear ferroelectric optics substrate 1, the electrodes 11 and 12 can repeatedly be used for a plurality of nonlinear ferroelectric optics substrates. Both the electrodes 11 and 12 or either the first electrode 11 or the second electrode 12 may be formed on the nonlinear ferroelectric optics substrate 1 by forming conductive films on the nonlinear ferroelectric optics substrate 1 and by selectively etching the conductive films in a given pattern by a photolithographic etching process. In such a case, at least either the first electrode 11 or the second electrode 12 is attached through an insulating film 2, such as a SiN film or a $SiO_2$ film, to the corresponding major surface of the nonlinear ferroelectric optics substrate 1.

The nonlinear ferroelectric optics substrate 1, is heated in an oxygen atmosphere or in air at a given temperature in the range of 150° to 1200° C., preferably in the range of 950° to 1200° C., more preferably in the range of 1000° to 1200° C., for example, at 1040° C. to reduce the intensity of the coercive electric field while a dc voltage which may not break down the insulating films 4 is applied across the electrodes 11 and 12 by the power source 13 for a predetermined time to create an electric field of an intensity in the range of several tens volts per centimeter to several thousands volts per centimeter across the nonlinear ferroelectric optics substrate 1 to form an inverted-domain structure 3 as shown in FIG. 3B. The first electrode 11 on the major surface 1a, i.e., the +c-surface, is connected to the positive electrode of the power source 13. The inverted-domain structure 3 comprises inverted domains of a direction reverse to the direction of the +c-axis formed in the major surface la, i.e., the +c-surface, in a pattern corresponding to that of the first electrode 11; that is, at a pitch in the range of 1 to 500 μm corresponding to that of the parallel electrode strips of the first electrode 11. When 300 V dc was applied for one hour across the electrodes 11 and 12 while the nonlinear ferroelectric optics substrate 1 is heated at 1040° C., 6 μm deep inverted domains were formed. After thus forming the inverted-domain structure 3, the electrode structures 21 and 22, hence the first electrode 11 and the second electrode 12, are removed from the nonlinear ferroelectric optics substrate 1.

In forming the inverted domains by this method, current concentrates in portions of the nonlinear ferroelectric optics substrate 1 in which the inverted domains are formed to damage the crystals of the nonlinear ferroelectric optics substrate 1 when a comparatively high voltage is applied across the electrodes 11 and 12. Therefore, the voltage is limited and the nonlinear ferroelectric optics substrate 1 is heated at a comparatively high temperature of, for example, 1040° C. However, it is possible that such a high heating temperature causes the electrode directly attached to the nonlinear ferroelectric optics substrate 1 to fuse, which is a problem particularly in forming the inverted domains at a fine pitch. Another embodiment intended to avoid such a problem will be described hereinafter.

Third Embodiment

A pulse voltage of a magnitude which may not break down the insulating film 4 and of a pulse width of 0.1 sec is applied twice across the electrodes 11 and 12 by the power source 13 to create an electric field of an intensity in the range of several hundreds volts per centimeter to several hundreds kilovolts per centimeter, for example, 400 V/cm, in the direction of the thickness, namely, in the direction of the c-axis, while a nonlinear ferroelectric optics substrate 1 is heated to reduce the intensity of the coercive electric field in a desired atmosphere, for example, in an atmosphere of oxygen, nitrogen, a rare gas or steam containing oxygen, at a given temperature in the range of 150° to 1200° C., preferably in the range of 300° to 900° C., more preferably in the range of 500° to 800° C., for example 600° C. The first electrode 11 formed on the +c-surface is connected to the positive electrode of the power source 13. Thus an inverted-domain structure 3 comprising inverted domains arranged in a patter as shown in FIG. 3B corresponding to that of the first electrode 11 comprising parallel electrode strips arranged at a pitch in the range of 0.1 to 500 μm is formed in the major surface 1a, i.e., the +c-surface.

The pulse voltage is in the range of several hundreds volts to several thousands kilovolts and has a pulse width of several microseconds. The pulse voltage may be applied once to several thousands times.

When the pulse voltage is used, the inverted domains can be formed under a comparatively lower temperature and, consequently, the diffusion of the electrode is avoided even if the electrode is attached directly to the nonlinear ferroelectric optics substrate 1, the contamination of the surface of the nonlinear ferroelectric optics substrate 1 can be avoided, and hence sharp inverted domains can be formed at a very small pitch as small as 0.1 μm.

As shown in FIG. $3C_1$, an optical waveguide 2 having a refraction index greater than that of the nonlinear ferroelectric optics substrate 1 is formed in the major surface 1a by applying, for example, pyrophosphoric acid to the major surface having the periodic inverted-domain structure 3 and subjecting the same to thermal diffusion, or by immersing the major surface 1a in hot phosphoric acid for proton substitution. The optical waveguide 6 thus formed includes the periodic inverted-domain structure 3. An optical waveguide 2 may be formed over the major surface 1a having the periodic inverted-domain structure 3 of the nonlinear ferroelectric optics substrate 1 by another method as shown in FIG. $3C_2$ by forming a layer of a linear or nonlinear material having a small fundamental wave absorption coefficient, such as $Ta_2O_5$ doped with $TiO_2$ so that $0 < Ti/(Ti+Ta) \leq 60$ (atomic percent), silicon nitride, titanium dioxide, arsenic selenide glass, zinc sulfate or zinc oxide, by a vapor deposition process or an epitaxial growth process.

An inverted domain other than the inverted-domain structure 3 having a pattern of parallel stripes formed on the nonlinear ferroelectric optics substrate 1, namely, an inverted domain corresponding to the connecting electrode 23 (FIG. 7) is cut off to finish a SHG having the periodic inverted-domain structure 3 comprising the parallel stripes of inverted domains extending across the direction of light transmission.

In the foregoing embodiment, both the electrodes 11 and 12 are formed in a pattern corresponding to the desired pattern of the periodic inverted-domain structure 3, but the second electrode 12 formed on the major surface 1b, i.e., the -c-surface, may be a plate electrode formed over the entire area of the major surface 1b so as to correspond to all the stripes of the first electrode 11.

As apparent from the foregoing description, according to the present invention, a first electrode 11 and a second electrode 12 are formed on a nonlinear ferroelectric optics substrate 1 to be provided with an inverted-domain structure 3, the first electrode 11 is formed on the major surface la, i.e., the +c-surface, in a pattern corresponding to that of the inverted-domain structure 3, and the first electrode 11 is connected to the positive electrode of a power source and the second electrode 12 is connected to the negative electrode of the power source to apply a dc voltage across the first electrode 11 and the second electrode 12 to form the inverted-domain structure 3 in the major surface 1a. This procedure for forming the inverted-domain structure 3 requires a very simple apparatus. When the electrodes 11 and 12 are formed respectively on insulating substrates 5 separate from the nonlinear ferroelectric optics substrate 1, the electrodes 11 and 12 can repeatedly be used for forming inverted-domain structures in a plurality of nonlinear ferroelectric optics substrates, which simplifies the process. Coating the electrodes 11 and 12 each with an insulating film 4 avoids the trouble of the electrodes 11 and 12 falling off the insulating substrates 5 when heated at a high temperature during the inverted domain forming process.

Since the first electrode 11 and the second electrode 12, particularly the first electrode 11 formed on the major surface 1a in which an inverted-domain structure 3 is to be formed, are separated from the nonlinear ferroelectric optics substrate 1 by the insulating films 4, the diffusion of atoms between the electrodes 11 and 12 and the nonlinear ferroelectric optics substrate 1 due to high-temperature heating can be avoided. Accordingly, the freedom of material selection and the freedom of atmosphere selection are enhanced and an atmosphere containing oxygen can be used for domain inverting process. The insulating films 4 prevent the flow of current through the nonlinear ferroelectric optics substrate 1 to avoid damaging crystals particularly in the major surface 1a in which an inverted-domain structure is to be formed. The prevention of the diffusion of atoms between the electrodes 11 and 12 and the nonlinear ferroelectric optics substrate 1 improves the purity to provide a SHG provided with an inverted-domain structure having satisfactory characteristics.

Furthermore, since the inverted domains are not formed by doping, such as Ti doping, the refractive index of the inverted domains remains unchanged and hence the division of a SH beam into a plurality of beams does not occur.

Still further, when a pulse voltage is used for forming an inverted=domain structure, a large current does not flow continuously through the nonlinear ferroelectric optics substrate 1 even if a high pulse voltage is applied, and hence the crystals of the nonlinear ferroelectric optics substrate 1 and hence the characteristics of the same are not affected by the application of the pulse voltage. Since the use of the pulse voltage requires a comparatively low heating temperature, the process and the apparatus are simplified and the deterioration of the characteristics by a high temperature can be avoided

Fourth Embodiment

A single-domain nonlinear ferroelectric optics substrate 1 is prepared by the same method as applied to the first embodiment. Masking films 31, namely, parallel stripes of a heat-resistant, heat-ray-absorbing or reflecting material, such as platinum, having a given width are arranged on a major surface 1a of the nonlinear ferroelectric optics substrate 1 in a pattern corresponding to that of a periodic inverted-domain structure 3 comprising parallel strips of inverted domains 3a arranged across the wave guide direction at a predetermined pitch as shown in FIG. 3B. The masking films 31 may be formed by forming a film of the heat-resistant material, for example, platinum, over the major surface 1a by a vapor deposition process, and by selectively etching the film by a wet or dry photolithographic etching process.

Although the masking films 31 are attached directly to the major surface 1a of the nonlinear ferroelectric optics substrate 1 in this embodiment, the masking films 31 may be formed by the same procedure on a heat-resistant insulating film 4 formed, for example, of $Al_2O_3$ or $SiO_2$ formed over the major surface 1a of the nonlinear ferroelectric optics substrate 1. It is also possible to form the masking films 31 in the predetermined pattern by the same procedure on an insulating plate 4 of $Al_2O_3$ or sapphire separate from the nonlinear ferroelectric optics substrate 1 and to place the insulating plate 4 on the nonlinear ferroelectric optics substrate 1 with the masking films 31 in contact with the major surface 1a of the nonlinear ferroelectric optics substrate 1.

The nonlinear ferroelectric optics substrate 1 thus combined with the masking films 31 is subjected to electromagnetic wave heating using heat rays radiated by a lamp or a heater, or laser beams emitted by a laser.

Figure 10:
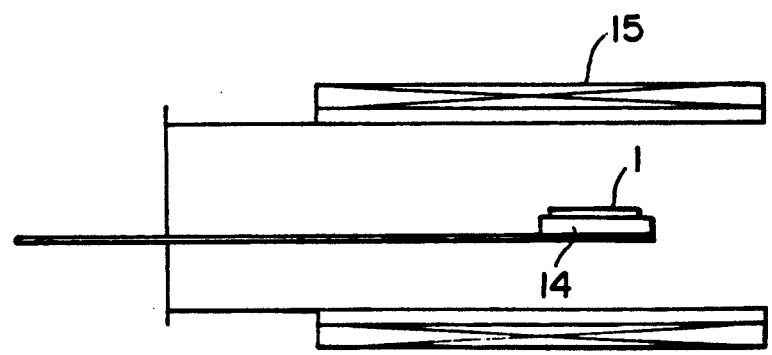
FIG. 10 is a diagrammatic illustration of a heating apparatus.

FIG. 10 is a schematic sectional view of a heating apparatus for heating the nonlinear ferroelectric optics substrate 1. The heating apparatus has a heating vessel 16 formed of a quartz pipe or the like, and a heat-resistant table 14 formed, for example, of quartz. The nonlinear ferroelectric optics substrate 1 combined with the masking films 31 is placed on the table 14 with the major surface 1b opposite the major surface 1a provided with the masking films 31 in contact with the upper surface of the table 14. A heating device 15, such as a heating lamp, is disposed around the heating vessel 16 to radiate heat rays toward the nonlinear ferroelectric optics substrate 1. Portions of the major surface 1a masked with the masking films 31 absorb or reflect heat rays efficiently, so that the portions of the major surface 1a are heated at a high temperature or portions other than the portions masked with the masking films 31 are heated at a high temperature to form heated or unheated portions in a pattern corresponding to that of the masking films 31. Platinum strips function as reflecting masking films for reflecting the electromagnetic wave, i.e., heat rays in this embodiment, to make portions of the major surface 1a of the nonlinear ferroelectric optics substrate 1 not masked by the masking films 31 to be heated selectively. A desirable temperature for local heating is in the range of 1000° to 1200° C. A heating and cooling rate of 5° C./min or higher enables the effective use of charges induced by the pyroelectric effect of the lithium niobate for polarization to form inverted domains.

Thus, the nonlinear ferroelectric optics substrate 1 provided with a periodic inverted-domain structure 3 consisting of an arrangement of the inverted domains 3a is obtained.

As shown in FIG. $3C_1$, an optical waveguide 2 having a refraction index greater than that of the nonlinear ferroelectric optics substrate 1 is formed in the major surface 1a by applying, for example, pyrophosphoric acid to the major surface 1a having the periodic inverted-domain structure 3 and subjecting the same to thermal diffusion, by immersing the major surface 1a in hot phosphoric acid for proton substitution. The optical waveguide 2 thus formed includes the cyclic inverted-domain structure 3. An optical waveguide 2 may be formed over the major surface 1a having the periodic inverted-domain structure 3 of the nonlinear ferroelectric optics substrate 1 by another method as shown in FIG. $3C_2$ by forming a layer of a linear or nonlinear material having a small fundamental wave absorption coefficient, such as $Ta_2O_5$ doped with $TiO_2$ so that $0 < Ti/(Ti+Ta) \leq 60$ (atomic percent), silicon nitride, titanium dioxide, arsenic selenide glass, zinc sulfate or zinc oxide, by a vapor deposition process or an epitaxial growth process.

Thus, a desired SHG provided with the periodic inverted-domain structure consisting of parallel strips extending across the wave guide direction is obtained.

In heating the nonlinear ferroelectric optics substrate 1 by the heating apparatus, it is desirable to heat the nonlinear ferroelectric optics substrate 1 beforehand substantially uniformly at a predetermined temperature. Accordingly, the table 14 may be formed of a material capable of absorbing the electromagnetic wave to some extent.

As is apparent from the foregoing description, according to the present invention, masking films 31 capable of absorbing or reflecting an electromagnetic wave for locally heating the major surface 1a of the nonlinear ferroelectric optics substrate 1 in which an inverted-domain structure is to be formed are formed simply on the major surface 1a of the nonlinear ferroelectric optics substrate 1, and no voltage application is necessary. Therefore, damages in the crystals of the nonlinear ferroelectric optics substrate 1 due to the application of a voltage thereto and the deterioration of the nonlinear ferroelectric optics substrate 1 in purity due to the diffusion of atoms between the electrodes and the nonlinear ferroelectric optics substrate 1 can be avoided, so that a SHG having stable characteristics can be formed.

Since no voltage needs to be applied to the nonlinear ferroelectric optics substrate 1, no complicated apparatus for voltage application is necessary and a stable inverted-domain structure can be formed through a simple process.

The masking films 31 capable of absorbing or reflecting the electromagnetic wave can accurately be formed in a minute pattern by a photolithographic process which is applied generally to manufacturing semiconductor devices, and hence a precision, periodic inverted-domain structure 3 of a minute construction consisting of fine inverted domains 3a can be formed accordingly. Since the diffusion of Ti or the like does not occur in forming the inverted-domain structure 3, the refractive index of the nonlinear ferroelectric optics substrate 1 remains unchanged, so that a SHG having excellent characteristics can be obtained.

What is claimed is:

1. A method of controlling the domain of a nonlinear ferroelectric optics substrate, comprising:
   forming a first electrode and a second electrode opposite to each other respectively on the opposite major surfaces of a single-domain nonlinear ferroelectric optics substrate, at least either the first electrode or the second electrode being formed in a given electrode pattern; and
   applying a given dc voltage across the first and second electrodes to form local continuously alternating inverted domains in a pattern corresponding to the electrode pattern where the local inverted domains alternately have a constant, opposite, polarization direction.

2. A method of controlling the domain of a nonlinear ferroelectric optics substrate, comprising:
   forming a first electrode and a second electrode opposite to each other respectively on the opposite major surfaces of a single-domain nonlinear ferroelectric optics substrate, at least either the first electrode or the second electrode being formed in a given electrode pattern; and
   applying a given pulse voltage across the first and second electrodes to form local continuously alternating inverted domains in a pattern corresponding to the electrode pattern where the local inverted domains alternately have a constant, opposite, polarization direction.

3. A method of controlling the domain of a nonlinear ferroelectric optics substrate, comprising:
   forming a first electrode and a second electrode opposite to each other respectively on the opposite major surfaces of a single-domain nonlinear ferroelectric optics substrate, at least either the first electrode or the second electrode being formed in a given electrode pattern on an insulating layer formed on the corresponding major surface of the nonlinear ferroelectric optics substrate; and
   applying a given dc voltage across the first and and second electrodes to form local, inverted domains in a pattern corresponding to the electrode pattern.

4. A method of controlling the domain of a nonlinear ferroelectric optics substrate, comprising:
   forming a first electrode and a second electrode opposite to each other respectively on the opposite major surfaces of a single-domain nonlinear ferroelectric optics substrate, at least either the first electrode or the second electrode being formed in a give electrode pattern on an insulating layer formed on the corresponding major surface of the nonlinear ferroelectric optics substrate; and
   applying a given pulse voltage across the first and second electrodes to form local, inverted domains in a pattern corresponding to the electrode pattern.

5. A method of controlling the domain of a nonlinear ferroelectric optics substrate according to claim 1, wherein the dc voltage is applied across the first and second electrodes while the nonlinear ferroelectric optics substrate is heated at a temperature in the range of 150° to 200° C.

6. A method of controlling the domain of a nonlinear ferroelectric optics substrate according to claim 2, wherein the pulse voltage is applied across the first and second electrodes while the nonlinear ferroelectric optics substrate is heated at a temperature in the range of 150° to/200° C.

7. A method of controlling the domain of a nonlinear ferroelectric optics substrate according to claim 3, wherein the dc voltage is applied across the first and second electrodes while the nonlinear ferroelectric optics substrate is heated at a temperature in the range of 150° to/200° C.

8. A method of controlling the domain of a nonlinear ferroelectric optics substrate according to claim 4, wherein the pulse voltage is applied across the first and second electrodes while the nonlinear ferroelectric optics substrate is heated at a temperature in the range of 150° to 200° C.

9. A method of controlling the domain of a nonlinear ferroelectric optics substrate, comprising: forming a first electrode and a second electrode opposite to each other respectively on the opposite major surfaces of a single-domain nonlinear ferroelectric optics substrate, at least either the first electrode or the second electrode being formed in a given electrode pattern: applying a given dc voltage across the first and second electrodes to form local inverted domains in a pattern corresponding to the electrode pattern, and, wherein the dc voltage is in the range of several tens volts per centimeter to several hundreds volts per centimeter.

10. A method of controlling the domain of a nonlinear ferroelectric substrate according to claim 3, wherein the dc voltage is in the range of several tens volts per centimeter to several hundreds volts per centimeter.

11. A method of controlling the domain of a nonlinear ferroelectric optics substrate according to claim 2, wherein the pulse voltage is in the range of several volts per centimeter to several kilovolts per centimeter.

12. A method of controlling the domain of a nonlinear ferroelectric optics body according to claim 4, wherein the pulse voltage is in the range of several hundreds volts per centimeter to several hundreds kilovolts per centimeter.

13. A method of controlling the domain of a nonlinear ferroelectric optics substrate according to claim 3, wherein said insulating layer is formed of such as $Al_2O_3$, $Si_xN_y$ or $SiO_2$.

14. A method of controlling the domain of a nonlinear ferroelectric optics substrate according to claim 4, wherein said insulating layer is formed of such as of $Al_2O_3$, $Si_xN_y$ or $SiO_2$.

15. A method of controlling the domain of a nonlinear ferroelectric optics substrate according to claim 2, wherein the pulse width of said pulse voltage is in the range of several microseconds to several minutes.

16. A method of controlling the domain of a nonlinear ferroelectric optics substrate according to claim 4, wherein the pulse width of said pulse voltage is in the range of several microseconds to several minutes.

17. A method of controlling the domain of a nonlinear ferroelectric optics substrate according to claim 2, wherein said pulse voltage is applied one to several thousands times.

18. A method of controlling the domain of a nonlinear ferroelectric optics body according to claim 4, wherein said pulse voltage is applied once to several thousands times.

19. A method of controlling the domain of a nonlinear ferroelectric optics substrate, comprising: forming a first electrode and a second electrode opposite to each other respectively on the opposite major surfaces of a single-domain nonlinear ferroelectric optics substrate, at least either the first electrode or the second electrode being formed in a given electrode pattern; applying a given dc voltage across the first and second electrode to form local inverted domains in a pattern corresponding to the electrode pattern, and, wherein said given electrode pattern comprises a plurality of parallel strips and the pitch of the strips forming the electrode pattern is in the range of 0.1 to 500 $\mu$m.

20. A method of controlling the domain of a nonlinear ferroelectric optics substrate, comprising: forming a first electrode and a second electrode opposite to each other respectively on the opposite major surfaces of a single-domain nonlinear ferroelectric optics substrate, at least either the first electrode of the second electrode being formed in a given electrode pattern; applying a given pulse voltage across the first and second electrodes to form local inverted domains in a pattern corresponding to the electrode pattern, and, wherein said given electrode pattern comprises a plurality of parallel strips and the pitch of the strips forming the electrode pattern is in the range of 0.1 to 500 $\mu$m.

21. A method of controlling the domain of a nonlinear ferroelectric optics substrate according to claim 3, wherein said given electrode pattern comprises a plurality of parallel strips and the pitch of the strips forming the electrode pattern is in the range of 0.1 to 500 $\mu$m.

22. A method of controlling the domain of a nonlinear ferroelectric optics substrate according to claim 4, wherein said given electrode pattern comprises a plurality of parallel strips and the pitch of the strips forming the electrode pattern is in the range of 0.1 to 500 $\mu$m.

* * * * *